March 24, 1964 I. D. NODINI 3,125,843
DUST ELIMINATOR FOR COMBINES
Filed March 23, 1962 4 Sheets-Sheet 1
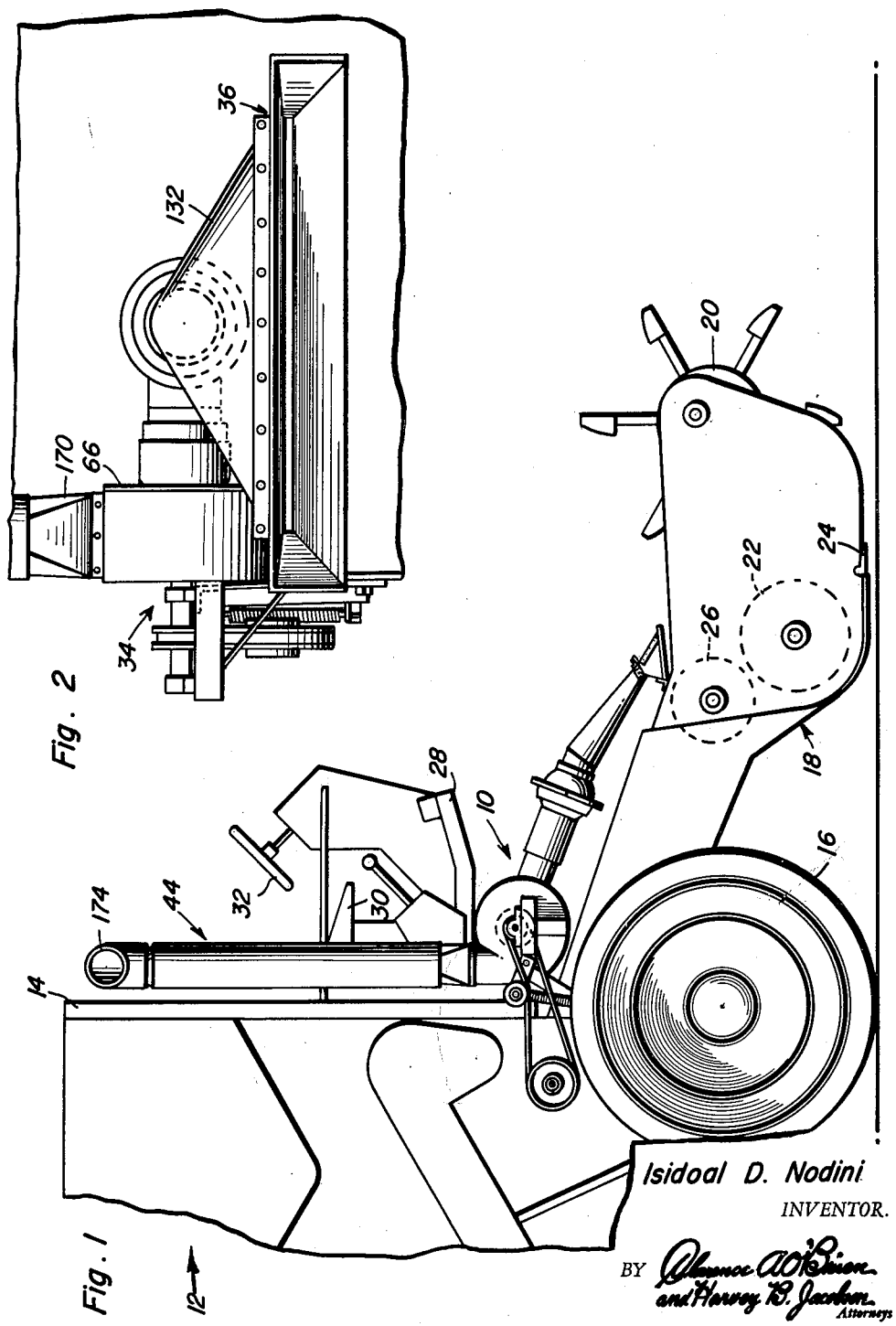
Isidoal D. Nodini
INVENTOR.

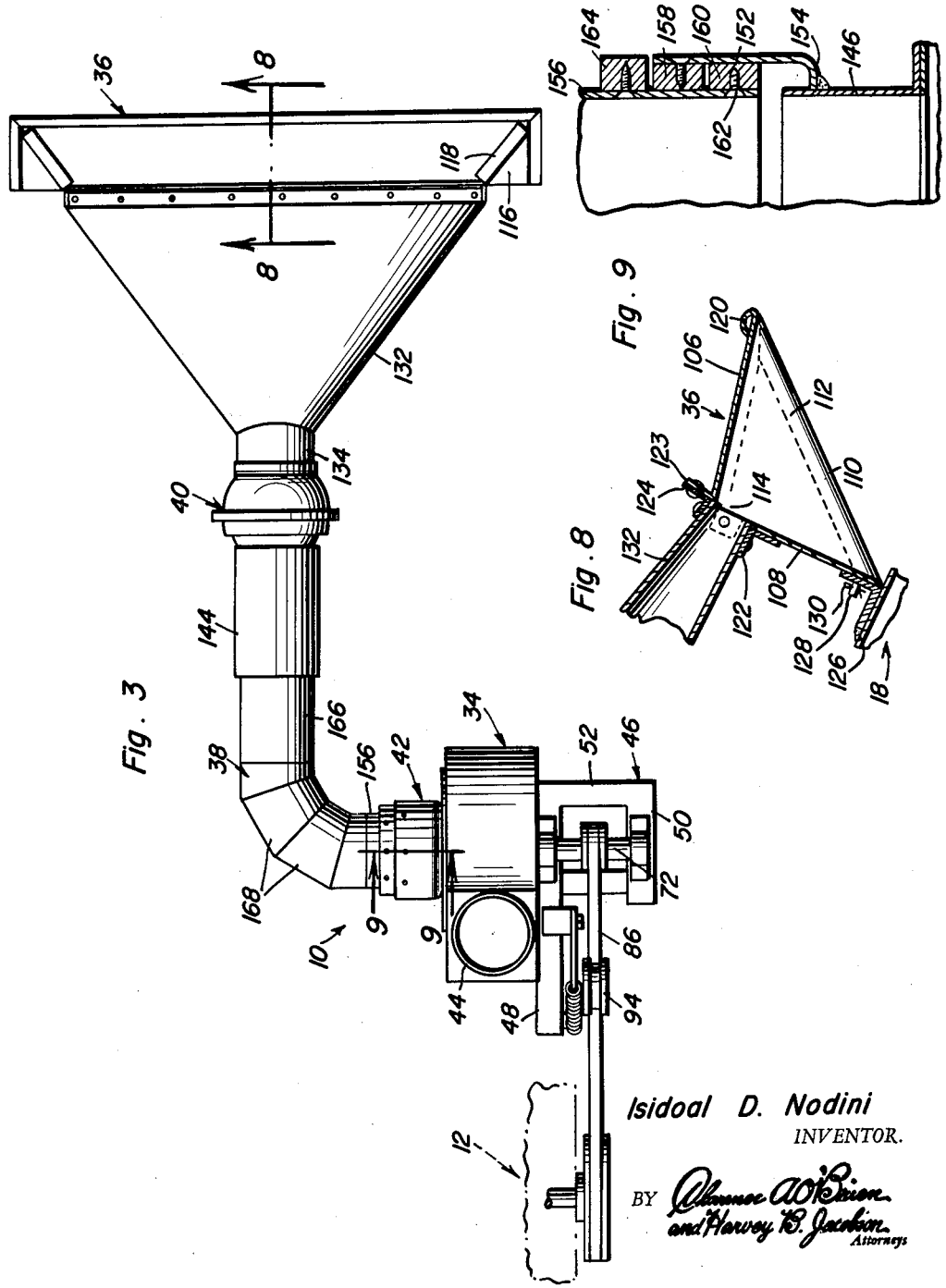

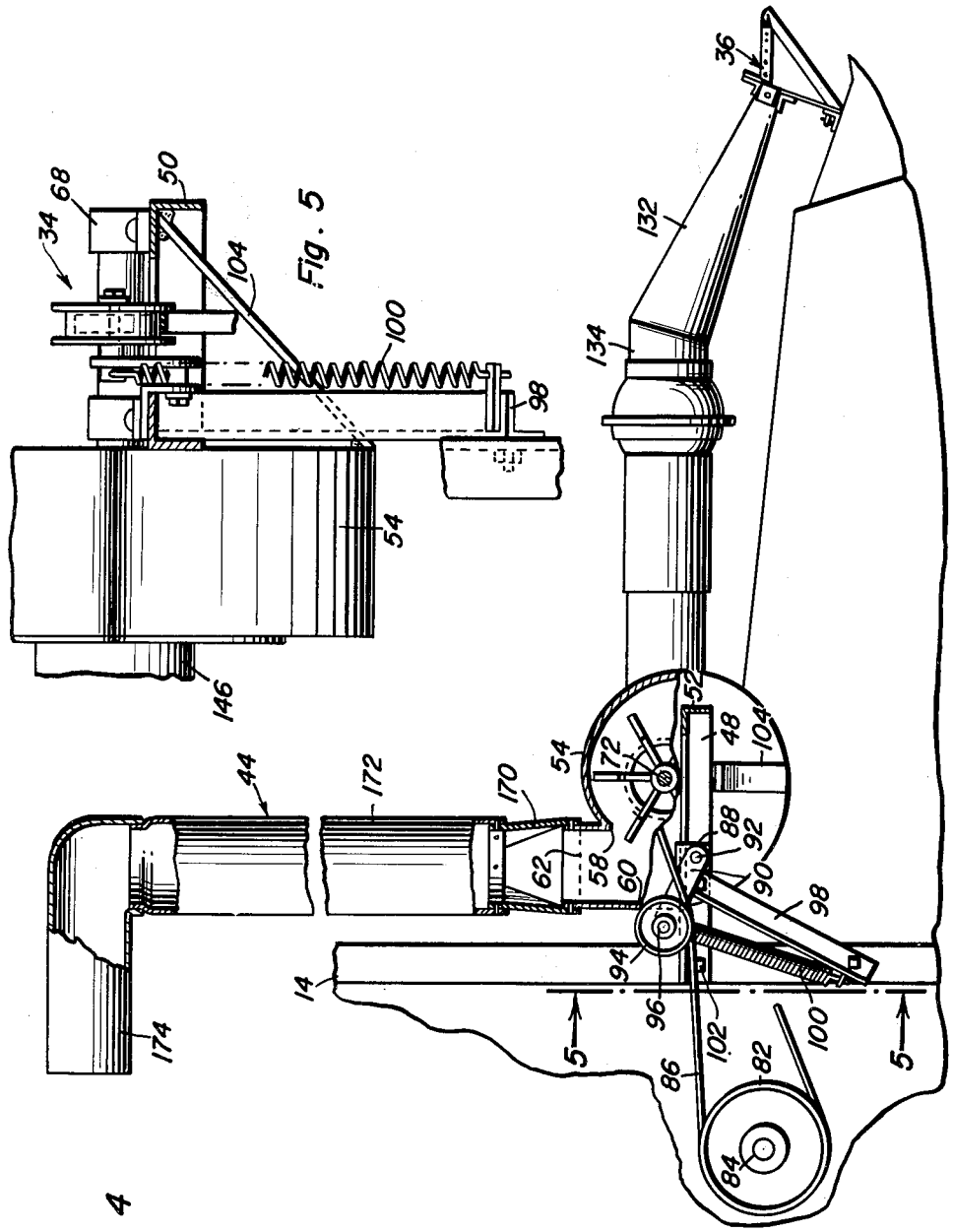

March 24, 1964
I. D. NODINI
3,125,843
DUST ELIMINATOR FOR COMBINES
Filed March 23, 1962
4 Sheets-Sheet 4
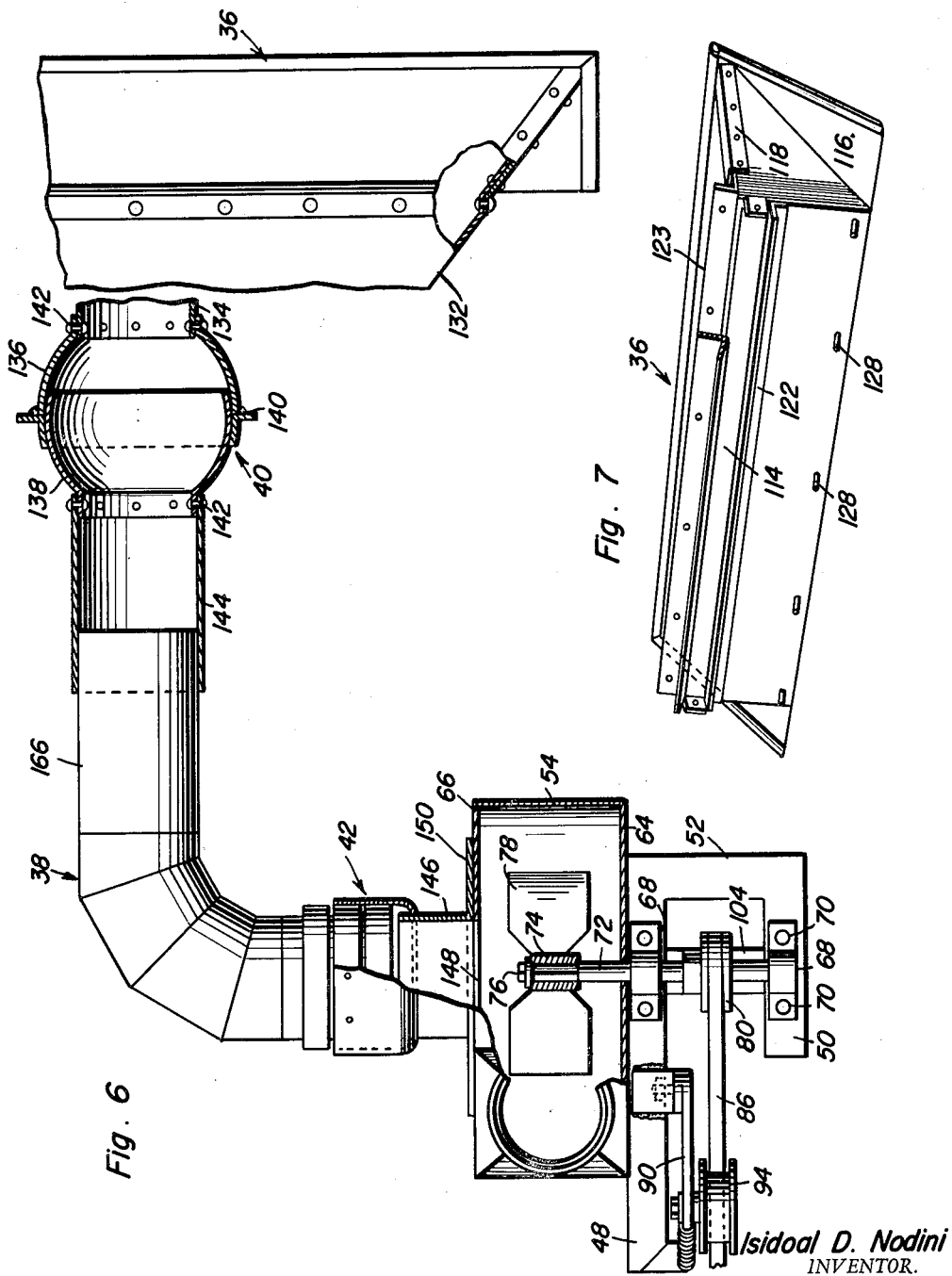

United States Patent Office 3,125,843
Patented Mar. 24, 1964

3,125,843
DUST ELIMINATOR FOR COMBINES
Isidoal D. Nodini, Crawfordsville, Ark., assignor of one-half to Borden E. Bell, West Memphis, Ark.
Filed Mar. 23, 1962, Ser. No. 182,042
2 Claims. (Cl. 56—20)

This invention relates to improvements on farm machinery, and particularly to a device for removing dust from the front end of a combine and exhausting the dust at a point remote from the operator of the combine.

Accordingly, it is a primary object of the invention to provide an improved device for protecting the operator of a combine from dust and polluted air in such a manner that it is not necessary for the operator to be enclosed in a sealed compartment or to wear a mask or gas filter.

It is another object of the invention to provide a device for removing dust from the front end of a combine so that the visibility of the operator thereof will be improved so as to permit him to more efficiently guide the combine and place the cutter thereof. This in turn increases the harvest and decreases damage to the combine.

It is another object of the invention to provide a device for protecting the operator of farm machinery from dust in a more efficient and simple manner than previous devices for accomplishing the same purpose.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view illustrating the invention mounted on the front end of a conventional combine;

FIGURE 2 is a front elevational view of the invention;

FIGURE 3 is a plan view of the invention;

FIGURE 4 is an enlarged side elevational view of the invention with parts broken away;

FIGURE 5 is an enlarged vertical cross-sectional view taken substantially on the plane of line 5—5 in FIGURE 4;

FIGURE 6 is an enlarged plan view of the invention with parts broken away;

FIGURE 7 is a perspective view of the intake nozzle for the dust remover;

FIGURE 8 is an enlarged vertical cross-sectional view taken substantially on the plane of line 8—8 in FIGURE 3; and FIGURE 9 is an enlarged vertical cross-sectional view taken substantially on the plane of line 9—9 in FIGURE 3.

As shown in FIGURE 1, the novel dust eliminator 10 is mounted on the front end of a conventional combine 12. The combine 12 includes a body 14 rotatably supported on a plurality of wheels, one of the front wheels being shown at 16. The combine 12 also is provided at its forward end with a conventional head 18 which includes a power driven reel 20, a continuous auger 22, a cutter bar 24 and a feeder beater 26. An operator's platform 28 is connected to the forward end of frame 14 above the front wheel 16. An operator's seat 30, a steering wheel 32 and other control apparatus are provided on the platform 28. During operation of the combine, the power driven elements 20, 22, 24, and 26 in the head 18 which cut, convey and process the grain being harvested obviously create a great deal of dust in front of the combine. This dust normally blows up onto the platform 28 thereby causing a great deal of discomfort to the operator and handicapping his visibility. The dust eliminator 10 is designed to eliminate this dust and the detrimental effects produced thereby.

The dust eliminator 10 includes a power driven fan 34, a nozzle or air scoop 36 connected to the fan by a conduit 38, a universal joint 40 and a swivel joint 42, and the dust eliminator 10 also includes an exhaust pipe 44.

The fan 34 includes a U-shaped supporting frame 46 comprising parallel spaced legs 48 and 50 connected at their forward ends by a bight portion 52. The members 48, 50 and 52 are formed from conventional angle members and are joined together integrally so that one leg of each angle member lies in a horizontal plane while the other leg of each angle member extends vertically. A fan housing is secured to the vertical flange of the angle member 48 and comprises a flat plate 54 which has been formed into a spiral shape so that its radius gradually increases with respect to the fan shaft 72 from point 58 to a point approximately located at 60 as indicated in FIGURE 4. At points 58 and 60, the plate 54 extends vertically upwardly so as to define an exhaust passage 62. The opposite side edges of the plate 54 are connected to the edges of a pair of parallel spaced side wall plates 64 and 66 which enclose the sides of the fan housing and the passage or duct 62. A pair of journal or pillow blocks 68 are connected in axial alignment to the upper surfaces of the legs 48 and 50 of frame 46 by means of rivets or bolts 70. A horizontal fan shaft 72 is rotatably journalled in the blocks 68, and one end of the shaft extends into the fan housing. A tubular hub 74 is splined on one end of the shaft 72 within the fan housing and is removably secured thereon by means of a bolt 76 threaded axially into one end of the shaft 72. The hub 74 is provided with a plurality of equally spaced radially extending centrifugal fan blades 78.

The end of the shaft 72 located between the legs 48 and 50 extends through and is splined to a fan pulley 80. A sheave or pulley 82 is drivingly connected to a power driven shaft 84 of the combine 12 so as to be located behind and in alignment with the pulley 80. An endless belt 86 encircles the pulleys 80 and 82 in driving relationship therewith.

A bracket is connected to the leg 48 of frame 46, and a pulley support arm 90 is pivotally mounted on the bracket by means of a horizontal pivot pin or stud 92. An idler pulley 94 is rotatably journalled on the free end of the arm 90 by means of a pivot pin 96. A spring support arm 98 is also bolted to the frame leg 48 and extends downwardly therefrom below the idler pulley 94. A coil spring 100 is tensioned between the free ends of the arms 98 and 90 so as to urge the idler pulley against an upper portion of the belt 86 for keeping the belt properly tensioned.

The rear end of the leg 48 of the fan frame 46 is secured to the forward end of the combine body 14 by means of bolts 102. A diagonal flat brace 104 is welded between the bottom edge of the fan housing and the leg 50.

As shown in FIGURES 2, 3, 7 and 8, the air scoop 36 comprises a pair of flat plates 106 and 108 forming an obtuse angle therebetween. The ends of the plates 106 and 108 are secured together by a pair of triangular end walls 110. The leading edges of the plates 106 and 108 are spaced a relatively wide distance apart so as to form a large air entrance opening 112, while the trailing edges of these plates are spaced a closer distance together so as to provide a relatively narrow exhaust passage 114. The end plates converge together in a rearward direction and the bottom edges thereof may be deflected outwardly so as to provide triangular end flanges 116. The edge connections between the plates 106, 108 and 110 may be reinforced by angle members 118 overlapping the edges and welded or riveted thereto. The leading edge of the plate 106 is bent back so as to form an arcuate edge 120. Parallel angle members 122 and 124 are secured in parallel relationship to the rear edges of the plates 106 and 108 so as to enclose the passage 114. An angle member 126 extends horizontally between the upper edges of the vertical side walls of the combine head 18 and is welded thereto. The lower edge of the plate 108 is provided with a row of attaching studs 128 which extend generally normal thereto and through bores in the upper flange of the angle member 126. The outer ends of the pins 128 are provided with bores which receive cotter pins 130 for removably securing the scoop 36 to the combine head. A sheet metal hollow duct 132 of generally triangular shape in plane is secured to the rear portion of the scoop 36. The forward end of the duct 132 is of rectangular shape and fits snugly between generally parallel flanges of the angle members 122 and 124 of the scoop and is riveted thereto. The rear end of the duct 132 terminates in a tubular portion 134. The vertical cross-sectional shape of the duct 132 gradually changes from rectangular to circular in a rearward direction. As shown in FIGURE 4, the duct 132 extends slightly downwardly and forwardly while the portion 134 is horizontal.

The universal joint 40, as shown particularly well in FIGURE 6, comprises a pair of hollow internesting part spherical members 136 and 138. The member 138 may rotate and slide in any direction within the member 136. The rear edge of the member 136 is welded to a circular angle member 140 which snugly encompasses a central portion of the member 138 and prevents axial separation between the members 136 and 138. The duct portion 134 extends into the forward end of the member 136 and is riveted thereto by means of rivets 142. The rear end of the member 138 is provided with an annular flange which telescopically extends into a tubular extension 144 and riveted thereto by rivets 142.

As shown in FIGURES 6 and 9, the swivel joint 42 comprises a tube 146 concentric with a bore 148 and fan shaft 72 secured to the side wall plate 66 by means of an integral annular flange 150 welded to the plate. Tube 146 is provided with a tubular extension 152 concentric therewith and connected thereto by a radially inwardly extending annular flange 154 welded to the tube 146. The tubular end 156 of conduit 38 is of smaller diameter than the extension 152 and extends therein in telescoping relationship. The annular space between the tube 156 and extension 152 is occupied by a pair of annular journal members 158 and 160 preferably composed of anti-friction material. The bearing members 158 and 160 are secured to the extension 152 and tube 156 respectively by means of a plurality of screws 162. An annular stop member 164 adjacent the outer edge of member 158 is also secured to the outer surface of the tube 156 by screws 162.

The conduit 38 comprises the tube 156 and a tube 166 at right angles to one another and integrally connected by a plurality of tubular sections 168 having canted ends and integrally welded together. The tube 166 is telescopically received in the tubular extension 144 as shown in FIGURE 6. Therefore, it may be seen that the universal joint 40, the swivel joint 42, and the telescopic and rotatable connection between the extension 144 and the tube 156 allows the scoop to be supported from the head 18 for movement with the latter relative to the body 14, the head 18 of the combine 12 being conventionally swingable relative to the body 14 thereof for allowing the head 18 to be raised and lowered relative to the ground surface which supports the combine 12.

The duct 62 of the fan housing serves as an exhaust duct and is provided with an upwardly tapered frustoconical extension 170. The extension 170 extends telescopically into the lower end of the L-shaped exhaust pipe 44 which comprises a vertical tube 172 whose upper end extends into and is connected telescopically with an annular opening in a horizontally extending tube 174. The tube 174 may be swivelled on the vertical axis of the tube 172 for exhausting the air and dust from the exhaust pipe in any desired horizontal direction.

In operation, the cutting, manipulation and processing of the grain by the combine elements 20, 22, 24 and 26 create a great deal of dust in front of the combine. The fan blades 78 are rotated by means of the pulley 82, belt 86, pulley 80 and shaft 72. The rotation of the fan blades creates a suction in the air scoop 36 whereby all or substantially all of the air and dust in the vicinity of the combine head 18 is sucked into the scoop, passes through the conduit 132, ball joint 40, conduit 38 and into the fan housing. The dust and air is then exhausted from the housing by means of the exhaust passage 62, the extension 170 and the exhaust pipe 44. The air is then exhausted horizontally in any desired direction through the horizontal exhaust tube 174 since this tube may be manually swivelled in any direction. Preferably, the tube 174 is rotated so as to exhaust the dust in the direction of the prevailing wind. Since the exhaust tube 174 is substantially elevated above the operator in the seat 30, the operator is never exposed or comes in contact with the dust created around the head 18. Also, since the head 18 is substantially free of dust, the operator may more clearly view the cutter blade 24 for more effectively steering the combine.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a conventional combine for harvesting and threshing grain crops including a body having an elongated transversely extending head supported from and spaced forwardly of its forward end, said head including means for cutting, conveying and processing grain crops against which said combine is advanced, a dust eliminator including a downwardly opening and transversely enlarged air scoop, means mounting said air scoop on said head above said cutting conveying and processing means, a fan assembly mounted on said body including an outlet and an inlet opening transversely of said combine, articulated conduit means generally L-shaped in plan sealingly communicating the outlet of said air scoop with the inlet of said fan assembly, an operator's platform mounted on the front of said combine body above said head and said scoop, articulated exhaust conduit means having its inlet end communicated with the outlet of said fan assembly and its outlet end opening outwardly to the ambient atmosphere above and in a direction away from said operator's platform, said L-shaped conduit means including first and second legs extending transversely and longitudinally of said combine respectively, the free end of said first leg including a swivel connection with said fan assembly inlet for rotation of said first leg about its longitudinal axis relative to said fan assembly, said second leg including a first section extending forwardly from and secured at its rear end to said first leg and a second section axially aligned with and slidably and rotatably telescopingly engaged with said forward end of said first section, the free forward end of said second section including a universal connection with the outlet of said air scoop whereby should it become necessary to raise said head relative to the ground by which said combine is supported in order to clear ground objects or for transportation purposes, said articulated inlet conduit means will be capable of maintaining communication between the outlet of said scoop and the inlet of said fan assembly.

2. The combination of claim 1 wherein said exhaust conduit means includes an upwardly directed outlet end portion which terminates at its upper end in a laterally directed tube swivelly supported from the remainder of an exhaust conduit means for movement about an upstanding axis while maintaining constant communication between said tube and the remainder of said exhaust conduit means.

References Cited in the file of this patent

UNITED STATES PATENTS

| | | |
|---|---|---|
| 1,844,750 | Ellis | Feb. 9, 1932 |
| 2,832,187 | Johnson | Apr. 29, 1958 |
| 3,094,829 | Claas | June 25, 1963 |